United States Patent [19]
Chizuk, Jr. et al.

[11] Patent Number: 5,617,129
[45] Date of Patent: Apr. 1, 1997

[54] IONOGRAPHIC PRINTING WITH A FOCUSED ION STREAM CONTROLLABLE IN TWO DIMENSIONS

[75] Inventors: Joseph A. Chizuk, Jr., Penfield; Richard F. Bergen, Ontario; Robert W. Gundlach, Victor, all of N.Y.

[73] Assignee: Xerox Corporation, Stamford, Conn.

[21] Appl. No.: 329,817

[22] Filed: Oct. 27, 1994

[51] Int. Cl.$^6$ ................................ B41J 2/415; B41J 2/06
[52] U.S. Cl. ................................ 347/123; 347/55
[58] Field of Search ............................. 347/120, 123, 347/122, 125, 141, 147, 151, 118, 55

[56] References Cited

U.S. PATENT DOCUMENTS

| | | | |
|---|---|---|---|
| 4,675,703 | 6/1987 | Fotland | 347/123 X |
| 4,763,141 | 8/1988 | Gundlach et al. | 347/123 |
| 4,839,670 | 6/1989 | Snelling | 347/123 X |
| 5,257,045 | 10/1993 | Bergen et al. | 347/123 |
| 5,325,121 | 6/1994 | Genovese | 347/125 |

*Primary Examiner*—Benjamin R. Fuller
*Assistant Examiner*—Raquel Yvette Gordon
*Attorney, Agent, or Firm*—R. Hutter

[57] ABSTRACT

An ionographic printer directs a stream of ions from a source to a charge receptor to create an electrostatic latent image thereon. The ion stream passes through a relatively large aperture having associated therewith a focusing pinch electrode for narrowing the ion stream to a preselected width, displacing electrodes for positioning the narrowed ion stream within the aperture, and focus electrodes. Varying the biases of the displacing electrodes causes the ion stream to scan across the aperture to deposit multiple spots of charged areas at desired locations on the receptor. Varying the biases of the focus electrodes cures positional and ion-stream cross-section anomalies.

3 Claims, 9 Drawing Sheets

TO FIG. 7A

IONOGRAPHIC PRINTING WITH A FOCUSED ION STREAM CONTROLLABLE IN TWO DIMENSIONS

This application incorporates by reference U.S. Pat. No. 5,257,045, assigned to the assignee hereof. Cross-reference is also made to U.S. Pat. No. 5,450,115, issued Sep. 12, 1995 entitled "Improved Apparatus for Ionographic Printing with a Focused Ion Stream," assigned to the assignee hereof.

The present invention relates to ionographic printers, and more particularly, to an improved apparatus for directing ions in imagewise fashion onto a charge receptor.

In electrophotographic printing, an electrostatic latent image is formed on a charge retentive surface. In the well-known process of xerography, the original electrostatic latent image is formed by providing a photosensitive charge-retentive surface, known as a "photoreceptor," which typically is first charged and then caused to discharge in areas corresponding to the image to be printed when an original light image to be copied is focused on the photoreceptor. The white areas of the original image cause the corresponding areas on the photoreceptor to discharge, while the printed areas (such as alphanumeric characters) on the original image create corresponding dark areas on the photoreceptor, on which the original charge is retained. This latent image is developed by causing toner particles to adhere to the charged areas on the surface. The toner forming this developed image on the surface is then transferred to a sheet, such as of paper, and then the toner is fused on the sheet to form a permanent image.

Another type of printing is known as ionography. In ionography, instead of using light to selectively discharge areas of a charged photoreceptor, a charge-retentive surface is charged in an imagewise fashion by the direct application of ions onto the charge retentive surface, known simply as a charge receptor. U.S. Pat. No. 5,257,045 describes a particular kind of ionography which utilizes a "focused ion stream." In this type of ionography, a continuous stream of ions are emitted from an ion source, such as a corona wire, and are made available to a charge receptor on which a latent image is to be created. Disposed between the ion source and the charge receptor is an ion deposition control device, which is preferably in the form of a substrate interposed between the ion source and the charge receptor. The control device includes a plurality of apertures therein, through which ions can be selectively admitted from the ion source to selected positions on the charge receptor, in order to form a latent image. Each of the apertures in the row has associated therewith a "pinch electrode" and one or more "displacing" electrodes. The purpose of the pinch electrode is to isolate a stream of ions from the radiations of ions which are generally being broadcast from the ion source and, in effect, to "funnel" this particular ion stream down to a predetermined cross-sectional width. By thus focusing an ion stream to a predetermined width, the ion stream can be directed to a suitably small spot size on the charge receptor, which in turn enables the creation of high-resolution latent images on the charge receptor. While the pinch electrode focuses an ion stream onto a small area on the charge receptor, the displacing electrodes are used to direct this narrow beam of ions to the desired location on the charge receptor, so that a desired small area on the charge receptor may be charged according to its location in a desired image to be printed. The practical advantage of ionography with an ion stream is that the apertures can be made relatively large compared to the possible spot size of charged areas on the charge receptor, and therefore the ion deposition control device can be made quite cheaply.

The present invention represents practical improvements to the ionographic printing system disclosed in the patent incorporated by reference.

In the prior art, U.S. Pat. No. 4,675,703 discloses an ionographic printer in which a solid dielectric member having a control electrode and a driver electrode disposed at opposite phases thereof, to cause the formation of ions in a region adjacent the controlled electrode. A screen electrode and a deflection electrode modulate the flow of ions to a charge receptor. The screen electrode is maintained at a fixed potential to control passage of ions through one or more apertures therein, while the deflection electrode provides further control over the size, shape and location of the electrostatic images created on the charge receptor. The deflection electrode may take the form of a conductive member on one side of the ion path, or two or more conductors straddling this path.

U.S. Pat. No. 4,763,141 discloses an ion source in which a corona wire is located 1–5 mm away from biased conductive plates which form a slit that allows ions to pass therethrough onto a receptor surface. The conductive plates are used to control the flow of ions through the slit and opposing wedges are positioned on each conductive plate to focus additional ions to the center of the slit. At the inside edges of the slit are additional fringe electric fields that aid in pumping the ions out of the slit.

U.S. Pat. No. 5,325,121 discloses an ionographic printing system in which there are provided electrodes adjacent the ion path to a charge receptor moving in a process direction. The electrodes are biased to an AC source. The frequency of the AC is selected to sweep the ion stream in two directions, parallel and anti-parallel to the process direction. The purpose of this sweeping of the ion stream is to disperse ions over a wider area on the charge receptor, and also to correct for velocity errors in the moving charge receptor.

In accordance with the present invention, an ionographic image printing apparatus comprises an ion source, a charge receptor, and a substrate interposed between the ion source and the charge receptor. A pinch electrode disposed on the substrate, includes a conductive surface facing the ion source. A displacing electrode associated with the aperture at a first location along a length thereof includes a conductive surface facing the charge receptor, and defines an edge uniformly spaced relative to a portion of the aperture edge. First and second focusing electrodes are provided, each in the form of a conductor spaced from the displacing electrode along the aperture and defining a conductive surface facing the charge receptor, and the first displacing electrode defining an edge parallel to an edge of the second focusing electrode.

According to another aspect of the present invention, there is provided an ion deposition control apparatus adapted to be interposed between an ion source and a charge receptor. A substrate defines an aperture therein. A pinch electrode in the form of a conductor is disposed on the substrate, defining a conductive surface facing the ion source. A displacing electrode associated with the aperture at a first location along a length thereof includes a conductive surface facing the charge receptor and an edge uniformly spaced relative to a portion of the aperture edge. First and second focusing electrodes are provided, each in the form of a conductor spaced from the displacing electrode along the aperture and defining a conductive surface facing the charge receptor, and the first displacing electrode defining an edge parallel to an edge of the second focusing electrode.

Figure 9:
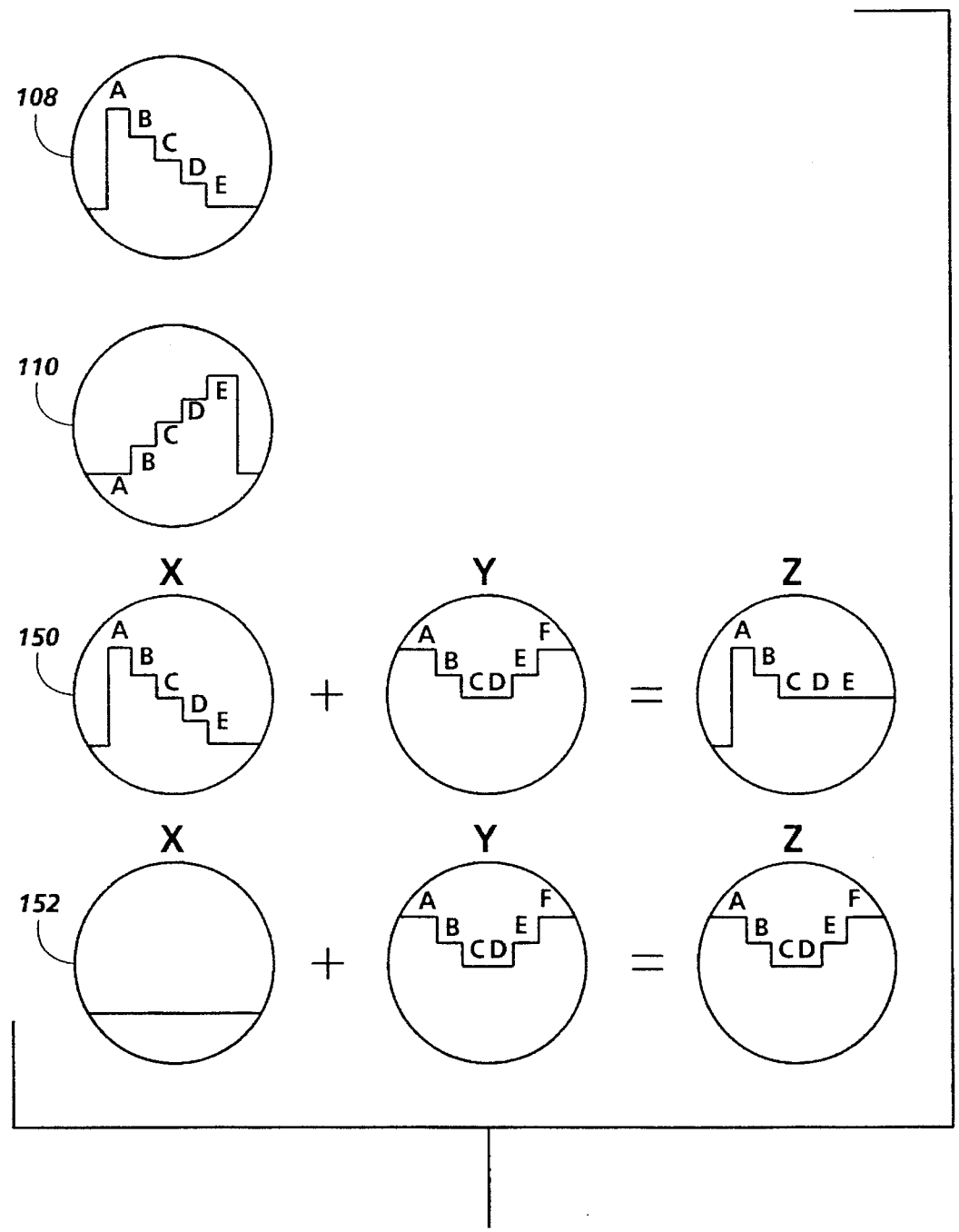
Figure 10:
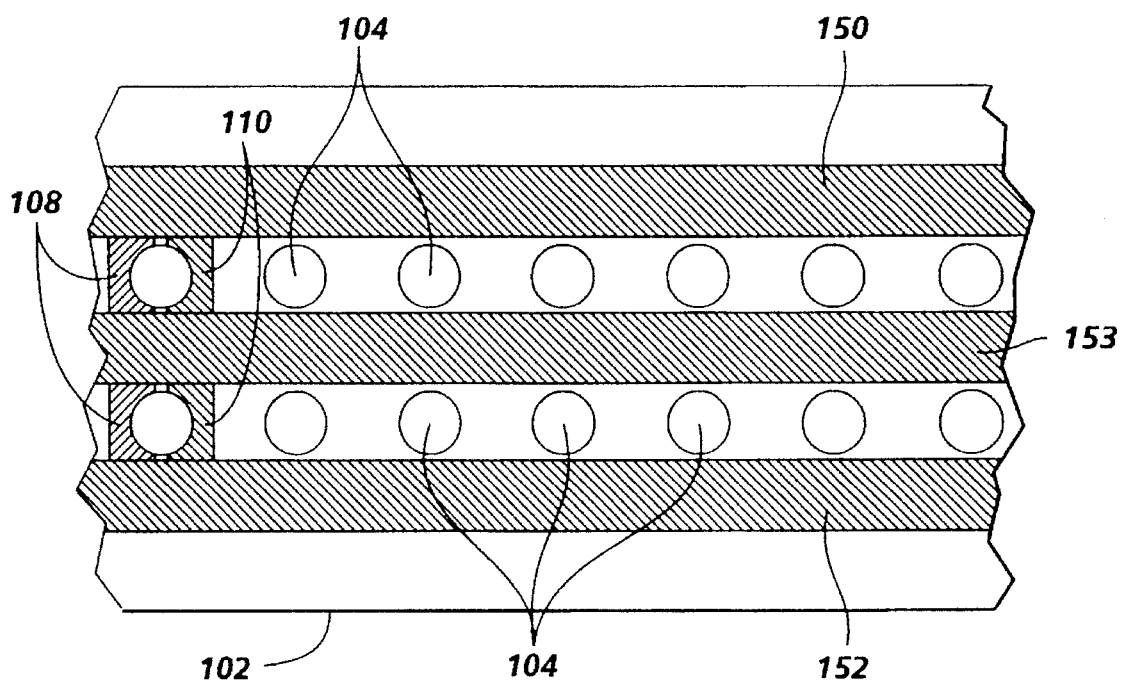
Figure 11:
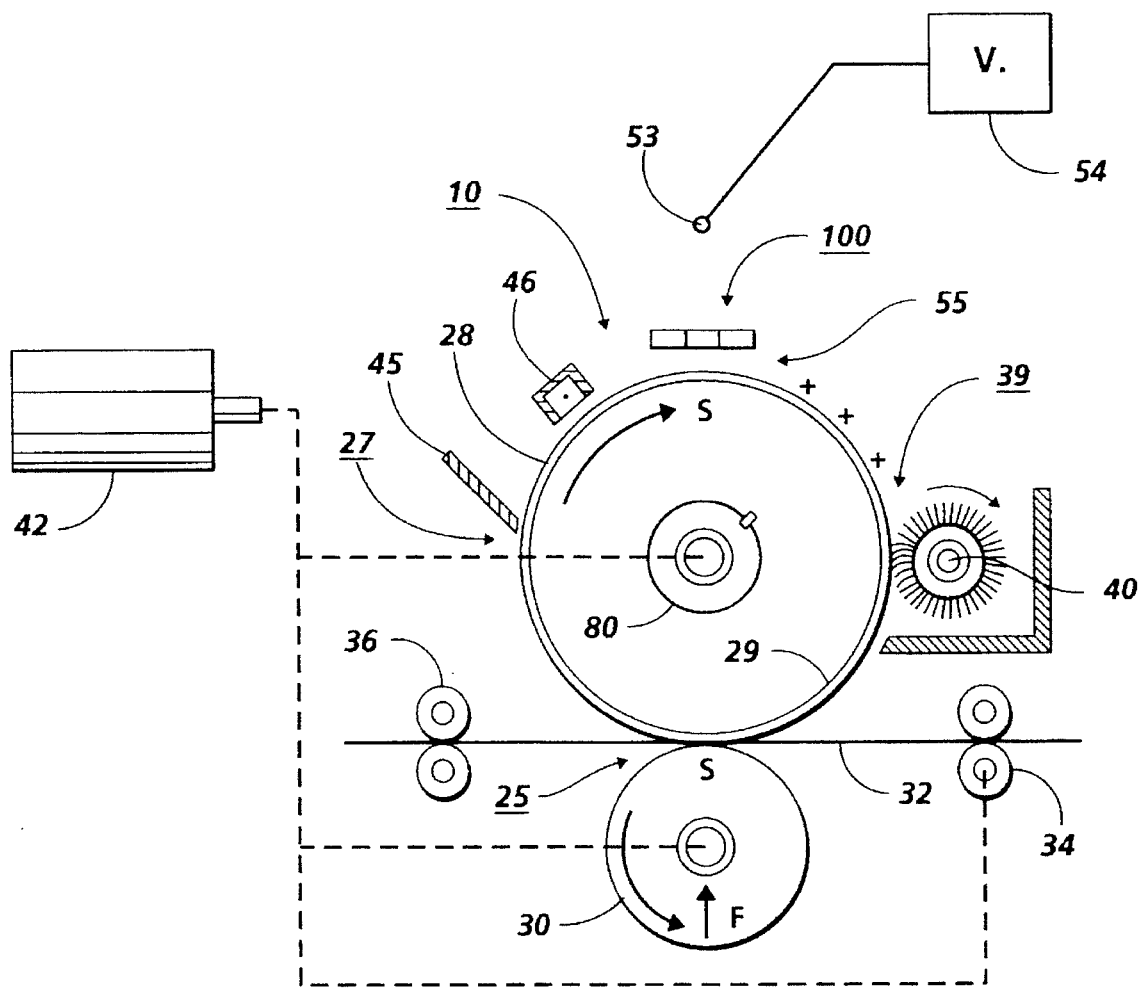

FIG. 9 is a diagram illustrating a set of waveforms of relative biases applied to electrodes associated with an aperture in the ionographic printing apparatus of the present invention FIG. 10 is a partial plan view of an alternate embodiment of an ion deposition control device according to the present invention; and FIG. 11 is a simplified elevational view of an ionographic printer incorporating the present invention.

FIG. 11 shows the basic elements of an ionographic printer. Printer 10 includes a dielectric charge receptor 27 in the form of a conductive substrate 29, here in the form of a drum or cylinder, having an electrostatically chargeable dielectric layer on its surface 28. While the receptor of printer 10 is shown and described in the form of a drum, other receptor types, such as a belt, may be envisioned. Receptor 27 is suitably supported for rotation in the direction shown by the solid line arrow in a suitable housing (not shown). In the example embodiment shown, a pressure cylinder or roller 30 is rotatably supported below receptor 27 and in operative relation thereto, at transfer station 25, roller 30 cooperating with receptor 27 to define a nip through which copy sheets 32 may pass. Roll pair 34 on the upstream side of transfer station 25 and roll pair 36 on the downstream side of transfer station 25 are provided for bringing sheets 32 into and out of transfer relation with receptor 27 at transfer station 25. Other methods for transfer of developed images, as opposed to pressure roller 30 shown, include electrostatic transfer using one or more transfer coronodes. Other transfer methods familiar in the general art of xerography will be apparent to one skilled in the art.

Sheets 32 are supplied from a suitable source such as a paper tray (not shown) having sheet feeder means and activated to advance the sheets forward in timed register relation with the images on receptor 27 for feeding to transfer station 25.

A developer roll 40 is provided at developing station 39 for developing the latent electrostatic images formed on receptor 27 prior to transfer. Developer roll 40 is rotatably mounted within a developer housing having a supply of toner for use of developing the electrostatic images on surface 28 of receptor 27. Developer roll 40 typically rotates in a direction opposite that of receptor 27, as shown by the arrow. Receptor 27, pressure roller 30, roll pairs 34 and 36, and developer roll 40 are suitably drivingly coupled to and rotated by a suitable motor 42.

To remove residual or leftover toner powder from receptor 27 after the transfer step, a scraper blade 45 is provided. Blade 45 engages against the surface of receptor 27 to wipe toner therefrom. A suitable erase apparatus 46 is provided downstream of blade 45, to discharge any left over charges remaining of receptor 27.

The latent electrostatic images formed in the dielectric layer forming surface 28 of receptor 27 that are thereafter developed by developer roll 40 form a toner powder image on the charge receptor. The toner powder image is then simultaneously transferred and fixed to the sheet 32 at transfer station 25 through pressure engagement between receptor 27 and roller 30. Once again, alternate transfer techiniques are well-known and applicable to the present invention.

At the beginning of the ionographic process, at a step corresponding to the top of receptor 27 as shown in the Figure, the originally-discharged surface 28 of receptor 27 is charged in imagewise fashion by ions emitted from source 53, which is typically, though not necessarily, in the form of a corona wire generally adjacent the receptor 27 across the width thereof. The source 53 is typically connected to a voltage source 54. Interposed between the source 53 and the surface 28 of receptor 27 is an ion deposition control device generally indicated as 100. Control device 100 has defined therein a plurality of openings to selectably allow the passage of ions from source 53 to the surface 28 of receptor 27, as receptor 27 moves in a process direction. The imagewise deposition of ions on the moving receptor 27 is caused by selective control of the apertures in control device 100 either to permit or not permit the passage of ions therethrough in accordance with digital image data. By coordination of the imagewise modulation of the ion flow through the openings in control device 100 with the motion of receptor 27, the ions emitted from source 53 form the desired electrostatic latent image on receptor 27 for subsequent development at developing station 39 and transfer to a sheet at transfer station 25.

Figure 1:
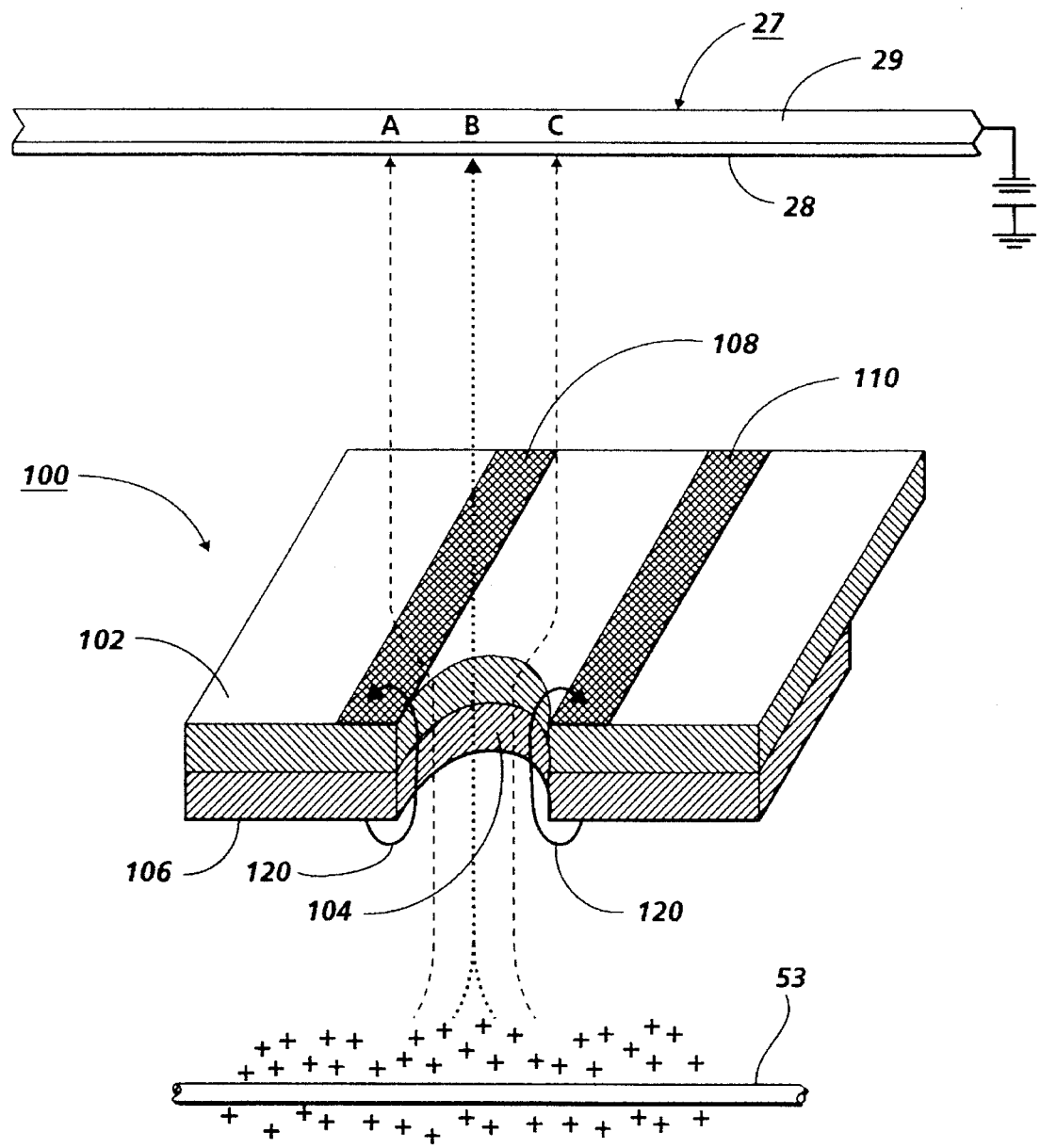
FIG. 1 is a detailed sectional elevational view of an ion stream control device according to the present invention.

FIG. 1 is a sectional elevational view through one opening in control device 100, showing the passage of positive ions, indicated as + symbols, from the source 53 through the opening to the surface 28 of receptor 27. Although a source of positive ions is shown in the present embodiment, it will be understood that the invention could be made to work with a source of negative ions as well. Source 53 may be in the form of a corona wire extending adjacent a plurality of such openings 104 arranged in a linear or staggered linear array, or possibly the source 53 may be in the form of electrically biased pin points centered adjacent each individual opening 104. Device 100 comprises an insulative substrate 102 having an opening 104 defined therein for the passage of ions therethrough. On the side of the substrate 102 facing the source 53 and, in this embodiment, substantially surrounding the entire edge of opening 104 is what shall be referred to herein as "pinch" electrode 106. On the side of substrate 102 facing receptor 27 are a first displacing electrode, indicated as 108, and a second displacing electrode, indicated as 110. As shown in FIG. 1, the displacing electrodes 108 and 110 are placed on the side of the substrate 102 facing receptor 27 and configured such that the displacing electrodes 108 and 110 are disposed on opposite sides along the edge of opening 104, and therefore electrically separated.

In operation, ions are caused to pass from the source 53 through control device 100 to receptor 27 in the following manner. Leaving aside for the time being considerations of placements of ions on a specific area of the receptor 27, the ions from source 53 are caused to move in the desired manner due to the potential difference between the source 53 and pinch electrode 106. This creates a "potential well" to drive the ions in the control device 100. The pinch electrode 106, the displacing electrodes 108 and 110, and the receptor 27 are respectively biased from high to low potentials, or specifically from more positive to less positive voltages, in that order. For example, typical values of DC bias for the respective elements would be as follows: the corona wire in source 53, +5000 volts; the pinch electrode 106, +1300 volts; displacing electrodes 108 and 110, +1000 volts each; and surface 28 of receptor 27, 0 volts. In general, the relative values of these biases are more important than their absolute values; the zero point in this descending order of DC biases is not important as long as the descending order is maintained. It is possible that surface 28 of receptor 27, for example, may have a very small positive bias, zero bias, or a negative bias, as long as a potential well effect is maintained. As the ions emitted from source 53 are of a positive charge, a negative bias on the surface 28 of receptor 27 will advance the passage of ions thereto.

When the pinch electrode 106 and the displacing electrodes 108 and 110 are biased to form a potential well, these electrodes create "pumping" electric fields on either side of opening 104, the fields being generally in the direction of an ion stream passing from source 53 through opening 104 to receptor 27. In the case where there is no lateral displacement of the ion stream through opening 104, the ions from source 53 will pass straight through opening 104 and "land" on surface 28 at the point marked B. One specific function of the pinch electrode 106 is to control the width of the ion stream passing through the opening 104. These pumping fields, such as that shown by arrows 120, have the effect of "catching" the ion stream from source 53 (the ions being naturally attracted to progressively lower potentials) and, in effect, focusing or acting as a funnel to draw the ion stream through opening 104. As pinch electrode 106 is biased more positively relative to either of the displacing electrodes 108 or 110 on the other side of substrate 102, the pumping fields are caused to loop through the opening 104 from pinch electrode 106 to either of the displacing electrodes 108 or 110. The strength of these fields 120 serve to control the width of the ion stream through opening 104. The bias on pinch electrode 106 therefore serves to collect and "pinch," or narrow, the width of the ion stream. The width of the resulting stream can be made significantly smaller (e.g., one-third to one-tenth the diameter, or even smaller) than the opening 104 itself. This pinching of the ion stream can be exploited to increase the resolution of an electrostatic latent image on receptor 27, as will be described in detail below.

While the pinch electrode 106 is used to control the width of the ion stream, displacement electrodes 108 and 110 are used to displace the position of the ion stream within the opening 104, and therefore to "aim" the pinched ion stream to a specific desired area on the receptor 27. Because, by virtue of the pinch electrode 106, the width of the ion stream can be made small relative to the width of the opening 104, the ion stream may be placed on the receptor 27 in an area within the area of the corresponding opening, and with a resolution which is much smaller than the size of the opening 104. Displacement of the ion stream to a precise area on the receptor 27, such as the areas marked A or C on surface 28, is accomplished by adjusting the relative biases of first displacing electrode 108 and second displacing electrode 110.

Figure 2A:
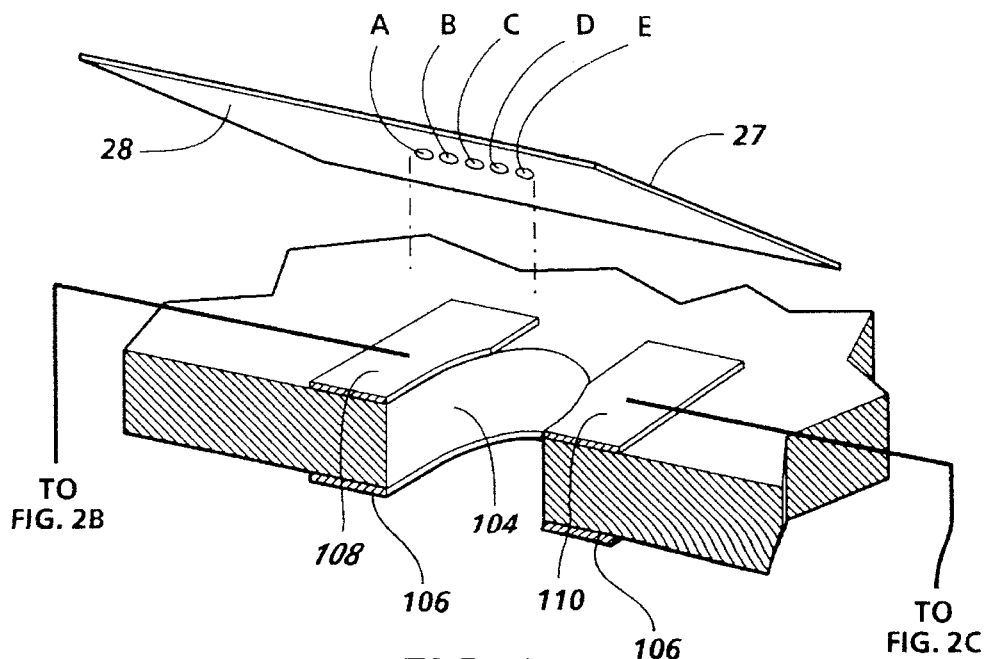
FIG. 2A is a perspective view of a single aperture in a prior-art ionographic apparatus, showing the technique of spot placement in a single aperture.
Figure 2B:
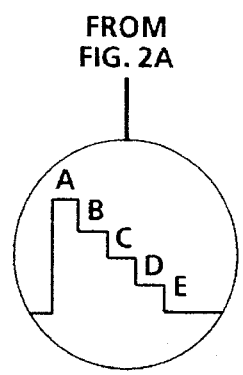
FIGS. 2B and 2C are diagrams illustrating the relative potential applied to electrodes shown in the ionographic apparatus shown in FIG. 2A.
Figure 2C:
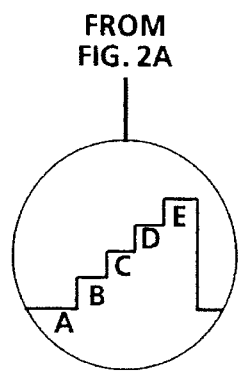

FIG. 2A illustrates how the relative biasing of displacing electrodes 108 and 110 can be employed to create high-resolution electrostatic images on surface 28 of receptor 27. The individual spots indicated as A, B, C, D, and E on surface 28 represent areas on surface 28 which are charged by the impingement of ions from ion source 53 through one opening 104 in control device 100. Various charged areas such as spots A, B, C, D, and E can subsequently be developed with toner to form desired images. Each spot A, B, C, D, and E represents the end of one pinched ion stream which has been displaced to one of five positions as it passes through opening 104 to "land" in the desired area on surface 28, generally scanning the diameter of opening 104 or slightly less than the diameter of opening 104. Indicated next to displacing electrodes 108 and 110, respectively, are simplified voltage diagrams showing the relative values of voltage biases for the displacing electrodes to cause the ion stream to be placed on the surface 28 in the desired area with the corresponding letter. The voltage levels indicated in the graphs are given for relative values only, and the absolute numerical values of these voltages can be determined when an actual apparatus is designed. Taking the spot marked A as an example, it can be seen that, for placement of such a spot in the desired area, the bias of displacing electrode 108 is low relative to the bias on displacing electrode 110, as can be seen in the graphs of FIGS. 2B and 2C. To place the desired spot further to the right in the Figure, the bias on displacing electrode 108 is increased while that on displacing electrode 110 is correspondingly decreased, as shown by the relative values of the voltages on either displacing electrode for spots B, C, D, and E. The adjustment of the relative biases of displacing electrodes 108 and 110 can thus be used to create a scanning of the ion stream across the receptor 27, and preferably (from an image creation standpoint) through a direction orthogonal to the direction of motion of receptor 27.

Figure 3:
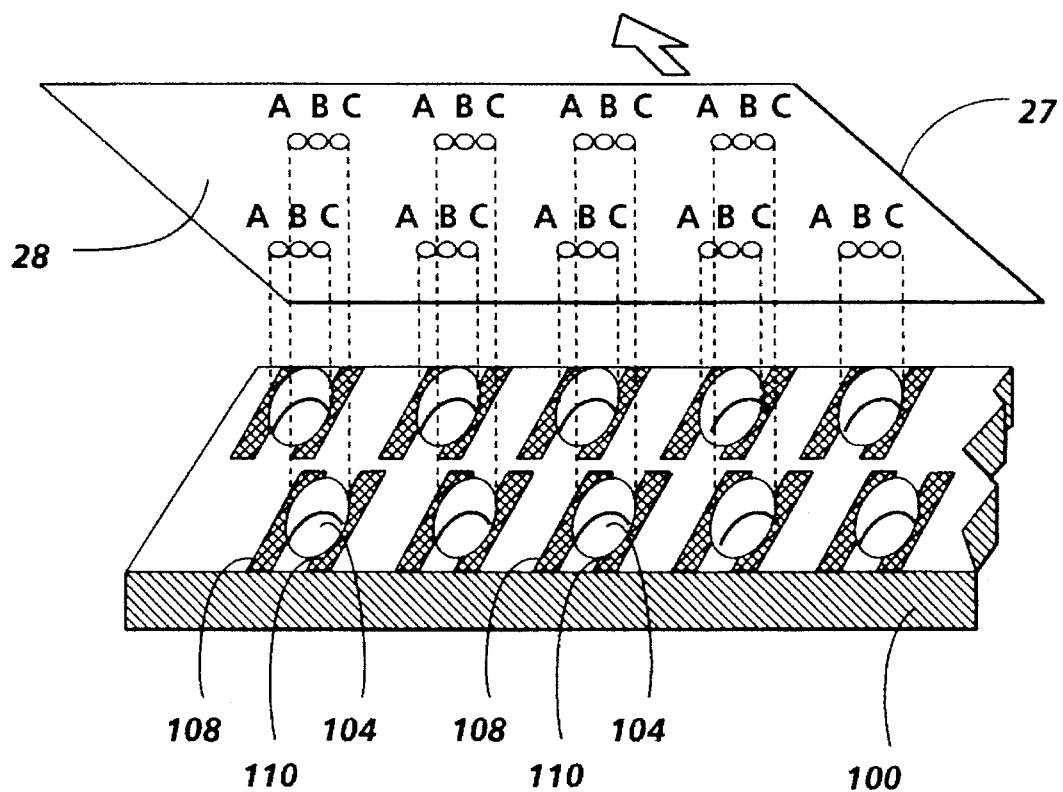
FIG. 3 is a simplified perspective view showing the operation of a prior-art ionographic printing apparatus having a plurality of apertures for the selective passage of ion streams therethrough.

FIG. 3 shows a control device 100 having a plurality of openings 104 in a substantially linear (specifically a staggered linear) array. The openings 104 are arranged perpendicular to the direction of motion of receptor 27, so that lines of areas on surface 28 of receptor 27 to be imagewise charged can be placed on receptor 27 as receptor 27 moves past the staggered linear array. The array of openings 104 is staggered, as shown, to facilitate abutment or slight overlap of areas on the receptor 27 within range of each opening 104.

In the embodiment shown in FIG. 3, each opening 104 in the staggered linear array is suitable for charging three spots (as opposed to five in the embodiment of FIG. 2) within the area "covered" by each opening. Thus, at a given time, by manipulation of pinch electrode 106 and displacing electrodes 108 and 110 for each opening 104, a spot in areas A, B, or C may be placed on the surface 28 as needed to create a particular desired electrostatic latent image. On the opposite side of the control device 100 that is shown in FIG. 3, each opening 104 has associated therewith an independently-controllable pinch electrode 106. As mentioned above, the purpose of pinch electrode 106 is to narrow the ion stream passing through the opening 104 by creating electric fields around the edges of opening 104. Because the pinch electrode 106 on a particular opening 104 can be used to shut off the ion stream completely, the pinch electrode 106 can thus be used for an input of image data to a particular spot being printed at a given moment. For example, if a particular spot in a given image requires the placement of charge in the spot (for subsequent development as a "print-black" area), a pinch electrode 106 can be activated to create the potential well which allows the ion stream to pass to the desired spot. If the desired spot is desired to be a "print-white" area, the pinch electrode 106 can be biased so that no ions reach the spot on surface 28. An array of openings 104, each with an independently controllable pinch electrode 106, then, may be easily adapted to render digital imagewise data on a moving receptor 27, much like any familiar type of dot-matrix printing arrangement. Even though the voltages involved in controlling the pinch electrode 106 can be high, extremely low currents can be employed to avoid expectable problems associated with high power.

In operation, each lettered spot associated with each opening 104 in the staggered linear array is "printed" (i.e., activated to permit or not permit the passage of ions to the respective spot on the receptor 27 in accordance with imagewise data) at the same time. Thus, by relatively biasing the displacing electrodes 108 and 110 for each individual opening 104 in the same way at the same time, all the spots A in a line may be printed, and then by readjusting the relative bias of every displacing electrode in the linear array, spots B and then C can be printed. Then, as the receptor 27 continues its relative motion, the next line of image data can be printed. The staggering of openings 104 in the array of course creates a staggered printing line, as shown, but this can be compensated for by delaying the loading of data as necessary to every other opening 104, in a manner which would be apparent to one skilled in the art. Similarly, the continuous movement of receptor 27 may require a compensation in the nature of the image data to the spots A, B, C in succession, since a finite amount of time is necessary to allow the creation of the spot with a necessary charge.

The ion deposition control device places streams of ions, creating spots of charged area on the latent image, on a charge receptor 27 which is typically moving at constant velocity. As shown in FIG. 3, the charge receptor 27 is caused to move continuously in a process direction P, as shown by the arrow, which is generally perpendicular to the orientation of the row of apertures 104. In a practical printing apparatus, it is preferable that the receptor 27 move continuously, and not in a stepped fashion, which would add to the expense of the apparatus, and also possibly introduce a source of positional error. However, because of the positions of the displacing electrodes 108 and 110, the ion stream passing through the aperture 104 is deflectable only through a path which is, as shown in FIGS. 2 and 3, substantially perpendicular to the process direction P. The fact that the receptor is moving at a constant velocity will mean that the resulting spots formed on the surface 28 will not be placed in a line perpendicular to the process direction P. Because (to take the example of FIG. 3) spot A will be created first in time before spot B and spot C as the surface 28 moves at constant velocity, the three spots will be arranged diagonally as they are made on the surface 28.

Figure 4:
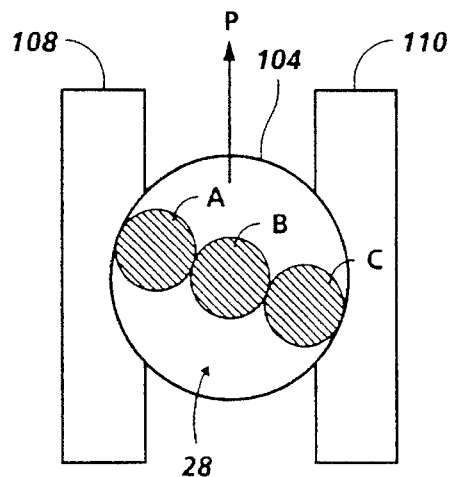
FIG. 4 is a plan view through a single aperture of an ionographic apparatus, illustrating the anomaly of spot placement skew.

FIG. 4 is a plan view through a representative aperture 104 to show the placement of spots A, B, and C on a surface 28 moving through process direction P. If straight lines across the surface 28 are desired to be printed, these lines will show a zig-zag effect, also known as "shingling," caused by the different spot families A, B, and C over a large number of apertures 104 being diagonally skewed relative to each other.

Another practical consideration for ionographic printing with a focused ion stream is the "bow tie" effect of deflected ion streams. Ion streams which are deflected minimally by the displacing electrodes 108 and 110, and which therefore pass through the aperture 104 toward the center thereof, tend to be reasonably round in cross-section. However, when the displacing electrodes 108 or 110 are used to displace this ion stream toward one edge or another of the aperture 104, the cross-sectional shape of the deflected ion stream tends to flatten out and become not round but elongated-oval. Because of the oval shape of the cross-section of the ion stream passing through aperture 104, the resulting spot of charged area on the surface 28 will be flattened oval area, and when the charged area is developed with toner, the various spots of developed area will vary in shape and size.

Figure 5:
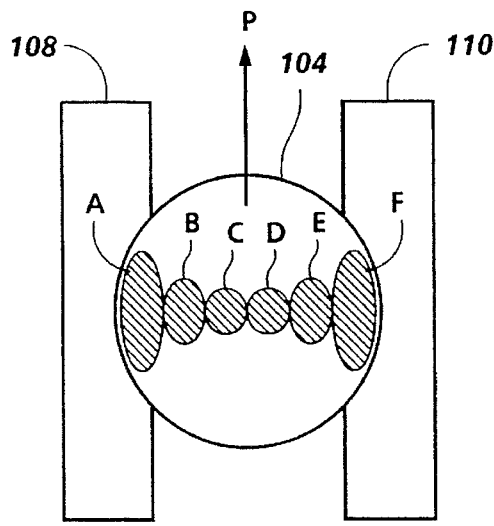
FIG. 5 is a plan view through a single aperture in an ionographic apparatus, showing the anomaly of ion stream cross-section distortion.

FIG. 5 is a plan view through an aperture 104 showing a typical behavior of an ion stream at various extents of displacement, shown in cross-section as A–F. The spots related to more displaced ion streams, such as spot A near electrode 108 or spot F near electrode 110, do not exhibit the desirable round shape of the spots such as C and D toward the center of the aperture 104.

Figure 6:
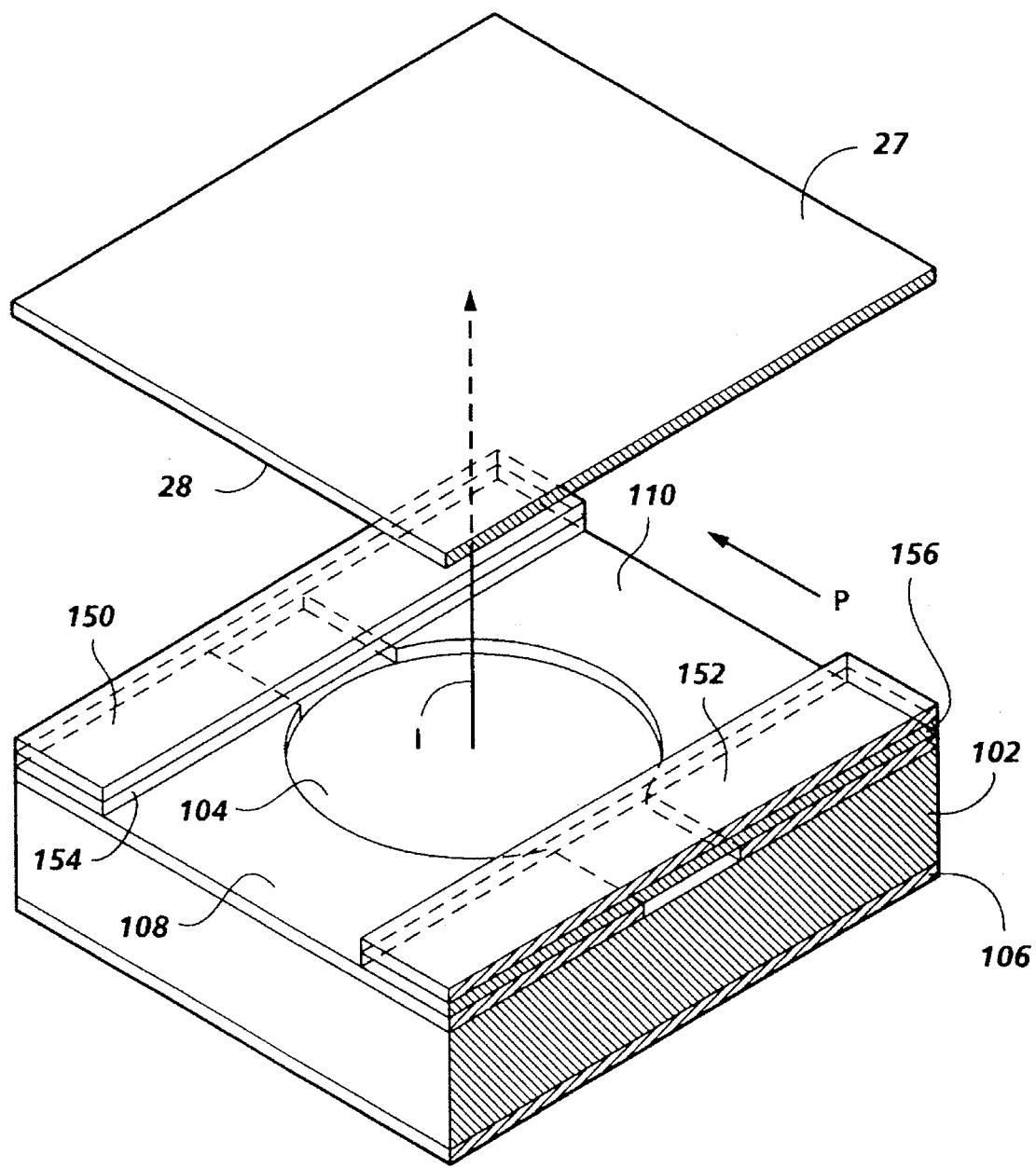
FIG. 6 is a perspective view of a single aperture, with associated electrodes, of an ionographic printing apparatus according to the present invention.

FIG. 6 is a perspective view of a single aperture 104, with accompanying electrodes, of an ionographic array (or ion deposition control apparatus) according to the present invention. As can be seen in FIG. 6, the aperture 104 defined in substrate 102 includes, in addition to the pinch electrode 106 and displacing electrodes 108 and 110, a pair of focus electrodes 150 and 152. The focus electrodes 150 and 152 are spaced from the displacing electrodes 108 and 110 by insulating substrates 154 and 156 respectively. If the path through an aperture 104 is considered the "length" of the aperture, and the displacing electrodes 108 and 110 are considered as disposed at one location along this length, the focus electrodes 150 and 152 are disposed at a second location along the length of the aperture 104. Also, while the displacing electrodes 108 and 100 are disposed across the aperture 104 from each other across one axis through aperture 104, the focus electrodes 150 and 152 are disposed across the aperture 104 from each other across a second axis through aperture 104, the second axis being substantially perpendicular to the first axis. As illustrated in the Figure, the thickness of substrate 102 is apparently much greater than that of insulators 154 or 156 for purposes of illustration, but it has been found that the thicknesses of the insulators 154 and 156 can be made approximately equal to or greater than that of the substrate 102. The relative thicknesses of the substrate 102 and the insulators 154 and 156 can be adapted for by adjusting the relative voltages to each electrode, or vice-versa, for optimal performance of the whole device.

The purpose of displacing electrodes 108 and 110 is to deflect the ion stream passing through aperture 104 along a first displacement path, that displacement path being generally perpendicular to the process direction shown as P in the Figure, such as that corresponding to the relative positions of spots A–F in FIG. 5. In contrast, the focus electrodes 150 and 152 are intended, by applying the correct relative bias voltage thereto, to displace the ion stream I along a second displacement path which is generally parallel to the process direction P. Thus, when the displacing electrodes 108 and 110 and the focus electrodes 150 and 152 are used in combination, the ion stream I can be effectively displaced or manipulated along two separate axes. This manipulation of the ion stream I can be used to compensate for the spot placement skewing such as shown in FIG. 4, and also the bow-tie effect in FIG. 5.

Figure 7A:
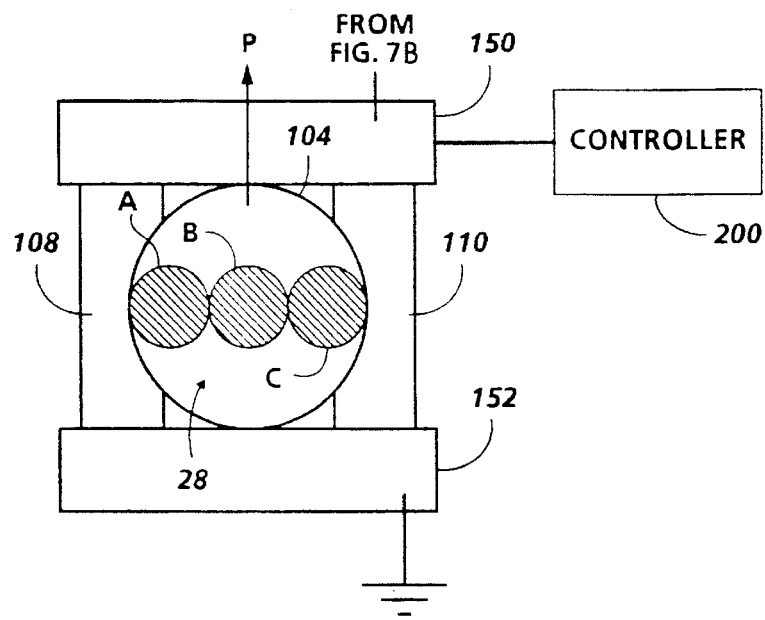
FIG. 7A is a plan view through an aperture of an ionographic printing apparatus according to the present invention, illustrating the operation of the apparatus to counteract the spot placement skew anomaly.
Figure 7B:
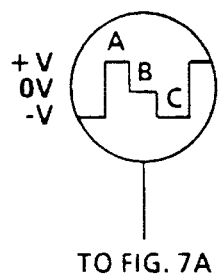
FIG. 7B is a diagram showing various potentials applied to an electrode in the ionographic printing apparatus shown in FIG. 7A.

FIG. 7A is a plan view through an aperture 104, showing the operation of focus electrodes 150 and 152 to cure a problem of spot-placement skew, as shown in FIG. 4. Shown as FIG. 7B is a diagram showing the relative bias voltages between focus electrodes to counteract the spot-placement skew. These voltages would be applied to the various electrodes via a control system 200, the structure of which would be apparent to one of skill in the art. As illustrated, focus electrode 150 is selectably provided with positive or negative voltages while focus electrode 152 is kept at ground, but what is important is that the relative voltages applied to the respective focus electrodes and that electrode 152 could be biased in absolute terms as well. In the waveform shown associated with focus electrode 150, there can be seen three "steps" labeled A, B, and C, corresponding to the placement of spots A, B, and C by the displacing electrodes 108 and 110. If the displacing electrodes 108 and 110, in combination with pinch electrode 106, are operated in a manner to print spots A, B, and C in order as surface 28 moves at constant velocity, the focus electrodes 150 and 152 can then be operated to displace the ion stream creating each of the spots along a displacement path parallel to process direction P. Thus, as spots A, B, and C are placed on surface 28 over time, the spots are placed along a line which is perpendicular to the process direction P on the moving surface 28. In brief, the function of the focus electrodes 150 and 152 is to compensate for the positional error caused by the time delays in placing the discrete spots A, B, and C on a surface 28 moving at constant velocity.

Figure 8A:
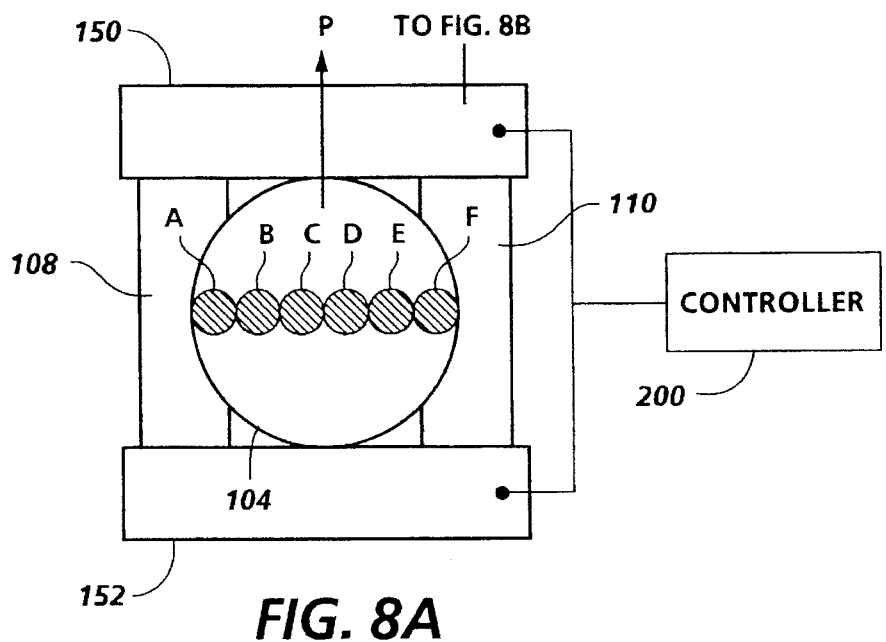
FIG. 8A is a plan view through an aperture of an ionographic printing apparatus according to the present invention, illustrating its operation to counteract the ion stream cross-section anomaly.
Figure 8B:
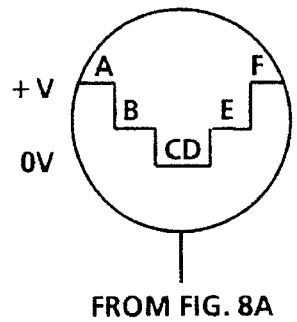
FIG. 8B is a diagram showing various potentials applied to an electrode in the ionographic printing apparatus shown in FIG. 8A.

The focus electrodes 150 and 152 can also be biased to counteract the bow-tie effect illustrated in FIG. 5. FIG. 8A is a plan view through an aperture 104, with electrodes 108 and 110 and focus electrodes 150 and 152, showing how the distortion of the cross-section of the displaced ion stream toward the edges of the aperture 104 can be counteracted by the application of an equal bias to both focus electrodes as shown in FIG. 8B. As can be seen by the waveform associated with the focus electrodes 150 and 152, the displacing electrodes 108 and 110 are used to deflect an ion stream toward the edges of aperture 104. This equal bias to both focus electrodes 150 and 152 is supplied by a control means 200 which is adapted to vary the bias to the focus electrodes 150 and 152 as a function of the relative bias between displacing electrodes 108 and 110. Increasing bias applied equally to both focus electrodes 150 and 152 can, in effect, "squeeze" the ion stream in a direction perpendicular to the displacement path formed by displacing electrodes 108 and 110, counteracting the distortion in the cross-section. This counteracting of the distortion can be seen by comparing the shapes of the spots A, B, E, and F in FIG. 5 and FIG. 8A respectively. The need for the "squeezing" effect of the focus electrodes 150, 152 requires more absolute voltage as the ion stream deflection caused by displacing electrodes 108 and 110 is increased such as in spots A and F. Spots C and D, which are close to the center of aperture 104, require essentially no correction by the focus electrodes 150, 152 at all. By use of this apparatus and technique, every spot of charged area placed on the surface 28 of charge receptor 27 will have generally the same desirable round shape, regardless of the extent of displacement of the ion stream by displacing electrodes 108 and 110.

Both the displacing electrodes 108 and 110 and the focus electrodes 150 and 152 include surfaces which face the charge receptor 27. As described in detail in the patent incorporated by reference, the fact that the pinch electrode 106 and the displacing electrode 108 and 110 face in opposite directions on the substrate 102 is relevant to the performance of the apparatus in "funneling" or focusing the ion stream to a desirable small cross-section. The same principle applies to the focus electrodes 150 and 152, which in effect may be said to act like a second set of displacing electrodes, operating at right angles to the regular displacing electrodes 108 and 110. While the displacing electrodes 108 and 110 are preferably shaped to define edges generally contiguous with the edge of the aperture 104, the focusing electrodes 150 and 152, because of the nature of their intended purpose, need not follow the edges of the apertures 104. Indeed, for the bow-tie correction, because both of the focusing electrodes are biased evenly, it would be desirable to provide a field which is even along the displacement path caused by electrodes 108 and 110, and this symmetrical field is best supplied by placing the focusing electrodes 150 and 152 parallel to each other, as shown.

The displacing electrodes 108, 110 are uniformly spaced relative to an edge of a portion of the aperture 104. As used in the claims herein, the phrase "uniformly spaced" shall mean that at least one edge of the displacing electrode should follow the contour of a portion of the aperture 104. The edge of the displacing electrode could be exactly contiguous with the edge of the aperture 104 (i.e. the spacing could be uniform but zero), or, according to a preferred embodiment of the invention, there may be provided some spacing between the edge of the displacing electrode and the edge of the aperture, so that the edge of the displacing electrode is uniformly spaced slightly away from the edge of the aperture. As with any electronic device having exposed conductors, the ion deposition control device may be prone to arcing between exposed conductors at different potentials. One design modification which reduces the incidence of arcing is to provide, along the edges of each aperture 104, a uniform spacing between the electrode on the surface of substrate 100 (either the pinch electrode 106 or one of the displacing electrodes 108, 110) and the actual edge of the aperture 104 itself. Thus, in the case of the displacing electrodes, the displacing electrodes such as 108 or 110 should be placed on the surface of the substrate 100 and should substantially follow the edge of the aperture 104, but should be spaced from the actual edge of aperture 104. The spacing from the edge of the electrode to the edge of the aperture 104 is preferably on the order of approximately 2 mils, for a substrate 100 having a thickness of 9 mils or less. As a general guideline, it is preferred that the spacing between the electrode edge and the aperture edge be no more than 3 mils, for a substrate 100 having a thickness of no more than 10 mils.

Focus electrodes 150 and 152 are useful for curing both the spot-placement skew caused by a charge receptor surface moving at constant velocity, and also the bow-tie effect caused by displacement of the ion stream. The spot placement skew is cured by providing relative voltage bias between the two focus electrodes, while the bow-tie effect is reduced by providing a selected absolute bias to both focus electrodes equally. The two types of correction, for skew and for the bow-tie effect, can be applied to the focus electrodes simultaneously, to cure both anomalies simultaneously.

FIG. 9 is a diagram showing a set of relative biases applied to various electrodes around a single aperture in an array wherein each aperture is capable of placing a spot of charged area in one of five possible locations associated with the aperture, such as in the example shown in FIG. 2 above. In FIG. 9, the waveform is shown labeled associated with the relative bias applied to that electrode for directing an ion stream to a location A–E. As can be seen, the displacing electrodes 108 and 110 are biased to symmetrical extents, just as in the example of FIG. 2, in order to displace the ion stream to positions A–E as required. Focus electrodes 150 and 152 are shown as having two types of biases applied to them simultaneously, the two separate waveforms being labeled as X and Y in each case, the X waveform being related to skew compensation, and the Y waveform in each case relating to the bow-tie correction waveform. For both focus electrodes 150 and 152, the waveform illustrated as Z represents the sum of the X and Y waveforms, indicating that both types of anomaly compensation are occurring simultaneously. Looking at the X skew-compensation waveform for both focus electrodes 150 and 152, only focus electrode 150 is DC biased to compensate for the spot placement skew while focus electrode 152 is not DC biased; this is equivalent to the situation in FIG. 7 above. Of course, what is important in this particular case is the relative biases between the focus electrodes, as coordinated with the constant-velocity motion of the charge receptor 27; the focus electrodes 150 and 152 may be biased in absolute terms in order to obtain the relative bias shown by the X waveforms. The Y waveforms are the same for both focus electrodes, with the absolute bias to both electrodes increasing for spots, such as A and E, where there is great displacement caused by the displacing electrodes 108 and 110.

When the X and Y waveforms for each focus electrodes 150 and 152 are combined, the resulting total waveform applied to the focus electrodes can be seen as the Z waveform in both cases. For all of the displacing electrodes and focus electrodes, what is here illustrated are relative biases only. The absolute values of these biases will depend on the specific design of the hardware itself. For example, the positions of each of these waveforms relative to 0 volts, and whether the "higher" biases are in fact more positive or more negative, depend on the design of the entire apparatus, particularly as regards the voltage of the original ion source. Also, the fact that the X and Y waveforms illustrated in FIG. 9 sometimes appear to cancel out when combined in the Z waveforms is specific to one possible embodiment only; the X and Y waveforms, and therefore any combination thereof, may be of any appearance depending on the specific properties and application of the particular ionographic apparatus.

A key practical advantage of the present invention is that the hardware of a single ionographic apparatus, meaning the ion deposition control device, can be controlled to create images of a wide range of resolutions. The displacing electrodes 108 and 110 can be controlled to provide a wide range of a number of steps, and therefore possible spot locations, per each aperture. It will be noted that, the more spot locations per aperture are provided, the less compensation for "shingling" of spots is typically required; and this consideration will affect the X waveform controlling the focus electrodes 150 and 152. The amount of "shingling" and the extent of compensation therefor will also depend on the desired process speed of the entire printing apparatus.

FIG. 10 is a plan view of a portion of an ion deposition control device according to another embodiment of the present invention, having two rows of apertures 104; the general function of such a two-row device is described in the patent incorporated by reference. As illustrated, the two parallel rows of apertures 104 can be designed to share at least one focus electrode, here indicated as 153, having a parallel edge adjacent each row of apertures. It will be apparent that focus electrodes 150, 152 and 153 are intended to be controlled in coordination with each other, as well as with the displacing electrodes associated with each aperture (in the Figure, the displacing electrodes 108, 110 for only one pair of apertures 104 are shown for purposes of illustration).

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An ionographic image printing apparatus, comprising:

an ion source;

a charge receptor;

a substrate, disposed between and spaced from the ion source and the charge receptor, having an aperture defined therein for passage of ions therethrough;

a pinch electrode, disposed on the substrate, including a conductive surface facing the ion source;

a displacing electrode, associated with the aperture at a first location along a length thereof, including a conductive surface facing the charge receptor, and having an edge uniformly spaced relative to a portion of an edge of the aperture;

a first focusing electrode and a second focusing electrode, each focusing electrode in a form of a conductor spaced from the displacing electrode along the aperture and defining a conductive surface facing the charge receptor, and the first focusing electrode defining an edge parallel to an edge of the second focusing electrode; and control means for applying a selected potential to the displacing electrode so that the displacing electrode displaces an ion stream passing through the aperture to a selected extent through a first displacement path;

wherein the control means apply a selected potential equally to the first focusing electrode and the second focusing electrode, said selected potential being a function of said selected extent of displacement of the ion stream through the first displacement path.

2. An ionographic image printing apparatus, comprising:

an ion source;

a charge receptor;

a substrate, disposed between and spaced from the ion source and the charge receptor, having an aperture defined therein for passage of ions therethrough;

a pinch electrode, disposed on the substrate, including a conductive surface facing the ion source;

a displacing electrode, associated with the aperture at a first location along a length thereof, including a conductive surface facing the charge receptor, and having an edge uniformly spaced relative to a portion of an edge of the aperture;

a first focusing electrode and a second focusing electrode, each focusing electrode in a form of a conductor spaced from the displacing electrode along the aperture and defining a conductive surface facing the charge receptor, and the first focusing electrode defining an edge parallel to an edge of the second focusing electrode;

control means for applying a selected potential to the displacing electrode so that the displacing electrode displaces an ion stream passing through the aperture to a selected extent through a first displacement path; and means for moving the charge receptor in a process direction;

wherein the control means bias at least one of the first focusing electrode and the second focusing electrode so that spots of charged area are successively created on the moving charge receptor along a path perpendicular to the process direction by ions passing through the aperture.

3. The apparatus of claim 2, wherein the control means apply a selected potential equally to the first focusing electrode and the second focusing electrode, the potential being a function of a selected extent of displacement of the ion stream through the first displacement path.

* * * * *